United States Patent
Lin et al.

(10) Patent No.: US 8,570,010 B2
(45) Date of Patent: Oct. 29, 2013

(54) MULTIPHASE POWER SUPPLY DEVICE AND CURRENT ADJUSTING METHOD THEREOF

(75) Inventors: Chih-Wei Lin, Taipei (TW); Nung-Te Huang, Taipei (TW); Chih-Wan Hsu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 399 days.

(21) Appl. No.: 12/913,779

(22) Filed: Oct. 28, 2010

(65) Prior Publication Data

US 2011/0115447 A1 May 19, 2011

(30) Foreign Application Priority Data

Nov. 19, 2009 (TW) ................................ 98139339 A

(51) Int. Cl.
*G05F 1/00* (2006.01)
*G05F 1/565* (2006.01)

(52) U.S. Cl.
USPC .......................................... 323/272; 323/275

(58) Field of Classification Search
USPC .......................................... 323/272, 907, 275
See application file for complete search history.

(56) References Cited

U.S. PATENT DOCUMENTS

| | | | | |
|---|---|---|---|---|
| 5,249,863 A * | 10/1993 | Brown | ........................ | 374/102 |
| 5,874,982 A * | 2/1999 | Ueda et al. | ................... | 347/194 |
| 6,351,081 B1 * | 2/2002 | Hwang | ........................ | 315/224 |
| 6,362,578 B1 * | 3/2002 | Swanson et al. | .............. | 315/307 |
| 6,449,174 B1 * | 9/2002 | Elbanhawy | .................... | 363/65 |
| 6,618,684 B1 * | 9/2003 | Beroset et al. | .................. | 702/99 |
| 6,724,643 B1 * | 4/2004 | Gibbs | ............................ | 363/54 |
| 2005/0060106 A1 * | 3/2005 | Lin | ................................ | 702/60 |
| 2005/0219883 A1 * | 10/2005 | Maple et al. | ................... | 363/178 |
| 2006/0061339 A1 * | 3/2006 | Lewis et al. | ................... | 323/237 |
| 2006/0285575 A1 * | 12/2006 | Park | ............................. | 374/141 |
| 2011/0003609 A1 * | 1/2011 | Sundstrom et al. | ........... | 455/509 |

FOREIGN PATENT DOCUMENTS

JP 2006-098111 4/2006

* cited by examiner

*Primary Examiner* — Adolf Berhane
*Assistant Examiner* — Emily P Pham
(74) *Attorney, Agent, or Firm* — Jianq Chyun IP Office

(57) ABSTRACT

A multiphase power supply device and a current adjusting method thereof are provided in the application. The multiphase power supply device outputs power sources and currents with different phases to a microprocessor, and a detection module detects present temperature values of each phase power source to adjust currents of each phase power source to achieve thermal balance. The multiphase power supply device further can automatically measure the power efficiency and display results including the detected temperature values of each phase power source and the power efficiency on a screen, and thus the user can know the operation efficiency of the power supply device conveniently.

11 Claims, 6 Drawing Sheets

MULTIPHASE POWER SUPPLY DEVICE AND CURRENT ADJUSTING METHOD THEREOF

CROSS-REFERENCE TO RELATED APPLICATION

This application claims the priority benefit of Taiwan application serial no. 98139339, filed on Nov. 19, 2009. The entirety of the above-mentioned patent application is hereby incorporated by reference herein and made a part of this specification.

BACKGROUND OF THE INVENTION

1. Field of the Invention

The invention relates to a multiphase power supply device and, more particularly, to a multiphase power supply device which can automatically adjust the temperature of the voltage of each phase and measure the efficiency.

2. Description of the Related Art

Since the efficiency of a microprocessor gradually increases, it needs more power and higher transient current. However, a conventional single-phase power supply cannot meet the requirement of current systems. The current microprocessors, image and the memory systems use the multiphase power source, and the power supply device at the motherboard supports the multiphase power supply technology. The common multiphase power supply includes a four-phase or an eight-phase voltage regulator module (VRM). The multiphase power supply has an advantage of phase joint. The multiphase power supply can switch the phase in a same timing interval. Consequently, the output voltage waveform and the current can be adjusted to the average level by switching other phases in a certain interval, and when the microprocessor needs an instant high current, the multiphase power supply can provide a higher instant current via more current paths.

The efficiency of the VRM marked at the conventional motherboard is usually measured by a VRTOOL (made by Intel). The VRTOOL is a tool for virtualizing the load of the microprocessor. The VRTOOL can generate the sourcing current from the VRM, and the data including the input voltage, the input current, the output voltage and the output current is read via the pins. Then, power efficiency is obtained via the formula:

$$\eta = \frac{Vout * Iout}{Vin * Iin}.$$

Wherein $V_{out}$ is an output voltage, $V_{in}$ is an input voltage, $I_{out}$ is an output current, and $I_{in}$ is an input current. Consequently, the efficiency under different loads conditions is obtained, and the highest efficiency is marked on the instruction for advertising. To measure the temperature of the VRM, an infrared camera is used to take pictures of the VRM. The current hot spot can be known via the relative temperature distribution in the pictures. However, the method cannot solve the problem of the heat accumulation. The power efficiency and the temperature of the two methods above are obtained by human operation. Thus, the measuring result is not accurate, the effect of the output power source is not good, and the power efficiency cannot automatically adjust.

BRIEF SUMMARY OF THE INVENTION

The invention provides a multiphase power supply device disposed at the motherboard. The multiphase power supply device uses a detection module to detect the temperature change of a power source of each phase, and adjusts the temperature of the power source of each phase via adjusting the current of each phase to achieve the temperature balance. Furthermore, the detection module can detect the power efficiency of the voltage regulator module (VRM) and display the efficiency value on a screen to allow the users to know the power efficiency of the VRM and the temperature change of the power source.

As stated above, the invention provides a multiphase power supply device including a VRM, a detection module, a calculation unit and a power source processing unit. The VRM is coupled to a power source and a microprocessor. The VRM provides the power source of multiple phases to the microprocessor via multiple current paths.

The detection module is coupled to the VRM for detecting the temperature of each of the current paths corresponding to the power source of each phase. The calculation unit is coupled to the detection module and calculates an average temperature according to the temperature of each of the current paths. Then the calculation unit compares the temperature of each of the current paths to output a comparing result. The power source processing unit is coupled to the calculation unit and the VRM, and adjusts the current of each of the current paths according to the comparing result.

The power source processing unit decreases the current of the current path when the temperature of one of the current paths is higher than the average temperature, and increases the current of the current path when the temperature of one of the current paths is lower than the average temperature.

The invention provides a current adjusting method of a multiphase power supply device. The multiphase power supply device outputs a power source of multiple phases via multiple current paths. The current adjusting method includes the following steps. First, detecting the temperature of the current path corresponding to the power source of all phases; second, calculating an average temperature according to the temperature of each of the current paths; third, comparing the temperature of each of the current paths with the average temperature to decide that the temperature of each of the current paths is higher or lower than the average temperature; forth, decreasing the current of the current path when the temperature of the current path is higher than the average temperature, and increasing the current of the current path when the temperature of the current path is lower than the average temperature. The method achieves the effect of the thermal balance by adjusting the current of the current path.

The multiphase power supply device of the invention has the function of automatically detecting the power efficiency and the temperature, and adjusts the current of the power source of each phase via the temperature detecting result of each phase to achieve the effect of temperature balance. Furthermore, the user can know the present power efficiency of the VRM and the temperature change of the power source of each phase via the screen.

These and other features, aspects, and advantages of the present invention will become better understood with regard to the following description, appended claims, and accompanying drawings.

DETAILED DESCRIPTION OF THE EMBODIMENTS

Figure 1:
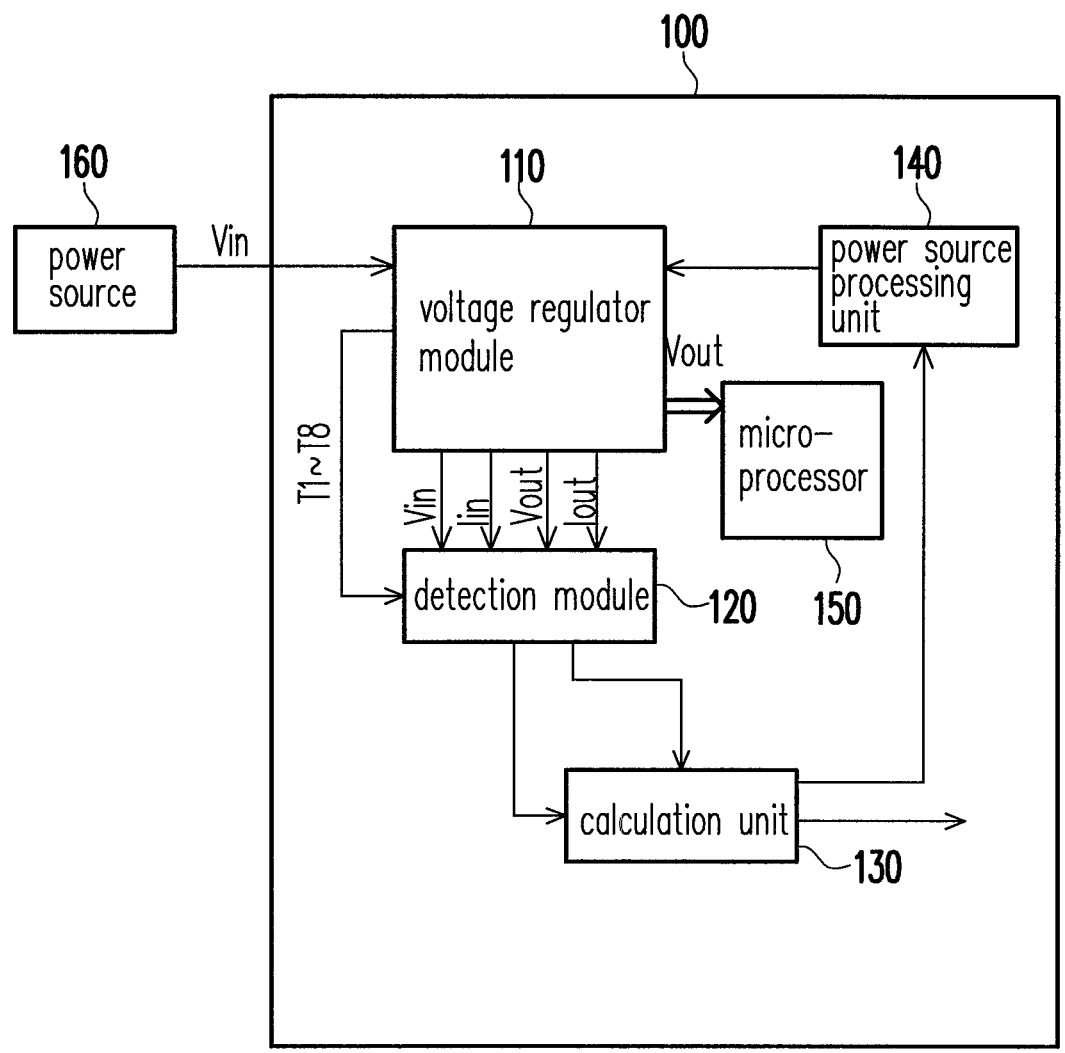
FIG. 1 is a block diagram showing a multiphase power supply device in one embodiment of the invention.

FIG. 1 is a block diagram showing a multiphase power supply device of the invention. The multiphase power supply device comprises a voltage regulator module (VRM) 110, a detection module 120, a calculation unit 130 and a power source processing unit 140. The detection module 120 is coupled to the VRM 110 and the calculation unit 130. The calculation unit 130 is coupled to the power source processing unit 140. The VRM 110 is coupled to the power source 160 and the microprocessor 150. The multiphase power supply device and the microprocessor 150 are disposed at a motherboard 100. The VRM 110 receives the input voltage $V_{in}$ outputted by the power source 160, and then converts the converted $V_{in}$ to the power source with multiple phases (represented by N phases) and outputs the converted $V_{in}$ to the microprocessor 150. N is a positive integer such as 4, 8, 16 or 36.

Taking an eight-phase power source as an example, the VRM 110 outputs eight-phase power source via eight current paths (eight switching circuits). The power source is divided into eight phases supplied to the microprocessor 150 via eight current paths. Thus, the eight-phase power source can supply higher current, and the current of some phases is lower than that of the conventional single-phase power supply, and thus the temperature produced by the power source is decreased. Furthermore, when the microprocessor 150 starts, it increases the required current instantly. At the time, the current may be provided via the eight current paths at the same time to provide a higher current output capacity for a higher load.

The detection module 120 is used for detecting the current path temperature T1 to T8 (taking the eight-phase power source as an example) of each phase of the power source outputted by the VRM 110. The detection module 120 can be disposed at the current path of each phase via a thermistor, respectively, and the thermoinduction components detect the current path temperature T1 to T8 of each phase. The current path temperature T1 to T8 represents the temperature of the power source with each phase. The thermistor can be disposed beside an inductor of each phase (the current path of each phase), its metal wires or components beside which the current flows to detect the temperature of each phase. Then, the detection module 120 transmits the detected current path temperature T1 to T8 to the calculation unit 130. The calculation unit 130 calculates an average temperature of the current path temperature T1 to T8, compares the temperature of each phase with the average temperature, and then transmits a comparing result to the power source processing unit 140. The power source processing unit 140 adjusts the current of each phase according to the comparing result. The power source processing unit 140 decreases the current of the phase whose temperature is higher than the average temperature, and increases the current of the phase whose temperature is lower than the average temperature to keep the whole temperature balance. Although the adjustment above may make the current of each phase unbalance, it keeps the whole temperature balance, and the user would not feel the current unbalance.

Furthermore, the detection module 120 also can detect the power efficiency of the VRM 110. The detection module 120 detects an input voltage $V_{in}$, an input current $I_{in}$, an output voltage $V_{out}$ and an output current $I_{out}$ of the VRM 110. Then, the power efficiency of the VRM 110 is calculated via the power efficiency formula. The power efficiency formula is shown as follows:

$$\eta = \frac{Vout * Iout}{Vin * Iin}.$$

The detection module 120 calculates a power efficiency value of the power source using the formula above and outputs the result to the calculation unit 130. The calculation unit 130 outputs the efficiency value of the power source and the detecting value of the temperature of each phase to the screen. The screen displays the detected data to allow the user to know the present power efficiency and the temperature of each phase conveniently. At the same time, the user can know the power efficiency of the VRM 110 under different loads conditions via the displayed values.

To detect the power efficiency, the detection module 120 in the embodiment may be achieved by a chipset of a power thermal module (PTM) and peripheral circuits to detect the input voltage $V_{in}$ the input current $I_{in}$, the output voltage $V_{out}$ and the output current $I_{out}$ of the VRM 110. The detection module 120 may detect the input voltage $V_{in}$ and the output voltage $V_{out}$ by using a voltage division circuit, and may detect the input current $I_{in}$ and the output current $I_{out}$ by a direct current resistance (DCR) sensing circuit.

Figure 2:
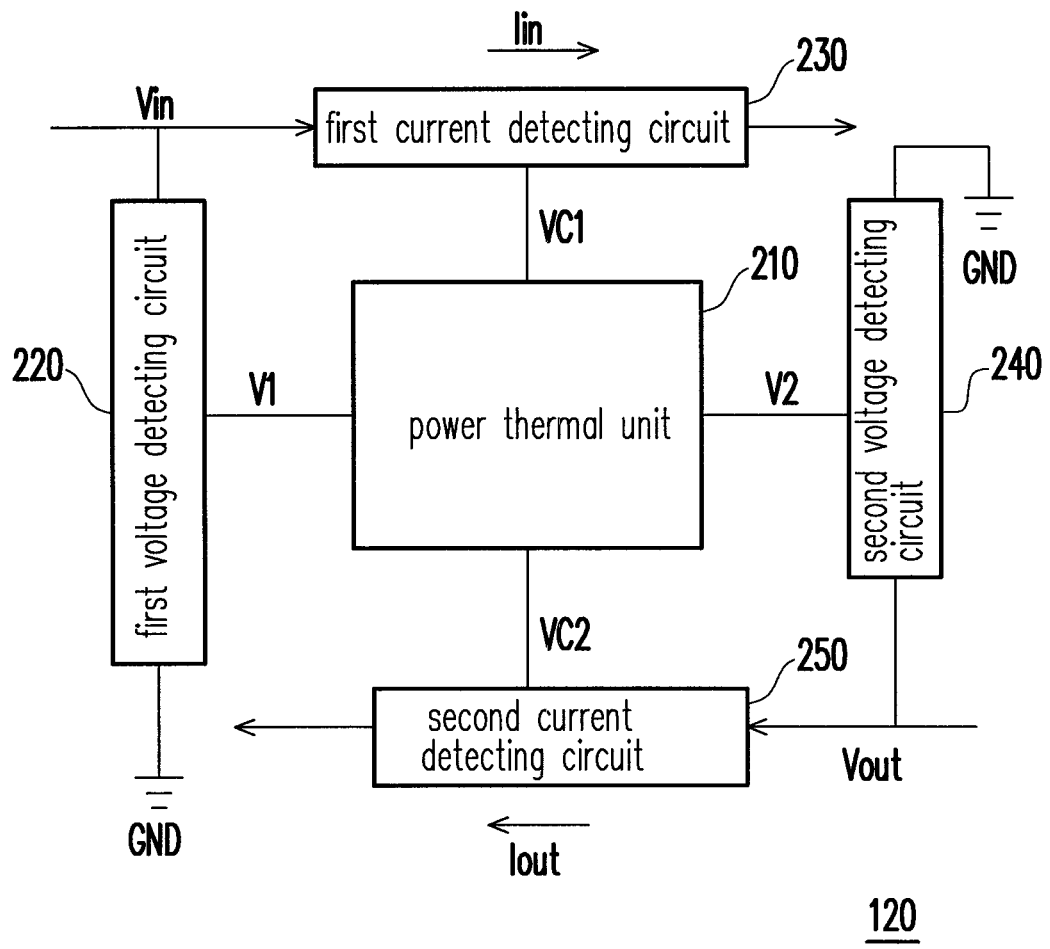
FIG. 2 is a circuit diagram showing a detection module in one embodiment of the invention.

FIG. 2 is a circuit diagram shows a detection module 120 in an embodiment of the invention. The detection module 120 includes a power thermal unit 210, a first voltage detecting circuit 220, a first current detecting circuit 230, a second voltage detecting circuit 240, a second current detecting circuit 250. The first voltage detecting circuit 220, the first current detecting circuit 230, the second voltage detecting circuit 240 and the second current detecting circuit 250 are coupled to the power thermal unit 210. The first voltage detecting circuit 220 and the second voltage detecting circuit 240 are voltage division circuits including resistors which can provide a divided voltage V1 of the input voltage $V_{in}$ and a divided voltage V2 of the output voltage $V_{out}$ to the power thermal unit 210. The first current detecting circuit 230 and a second current detecting circuit 250 are the DCR sensing circuits including resistors, inductors and capacitors. The power thermal unit 210 calculates the input current $I_{in}$ and the output current $I_{out}$ via the divided voltage VC1 and VC2 of the capacitors of the current detecting circuit.

Figure 3A:
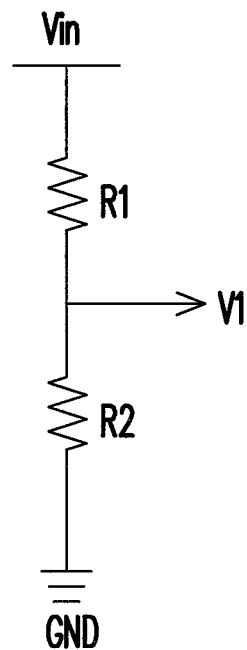
FIG. 3A is a circuit diagram showing a first voltage detecting circuit in one embodiment of the invention.
Figure 3B:
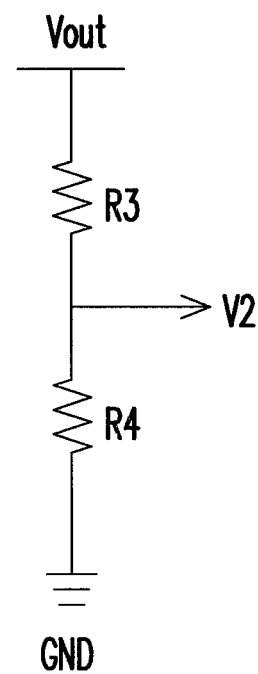
FIG. 3B is a circuit diagram showing a second voltage detecting circuit in one embodiment of the invention.

Detailed description about the circuit of the first voltage detecting circuit 220, the first current detecting circuit 230, the second voltage detecting circuit 240 and the second current detecting circuit 250 are shown as follows. FIG. 3A shows the circuit of the first voltage detecting circuit 220 according to an embodiment of the invention. FIG. 3B shows the circuit of the second voltage detecting circuit 240 according to an embodiment of the invention. The first voltage detecting circuit 220 includes resistors R1 and R2 coupled in series to the input voltage $V_{in}$ and a ground end, respectively, and the common end of the resistors R1 and R2 outputs a divided voltage V1 to the power thermal unit 210. The second voltage detecting circuit 240 includes the resistors R3 and R4 coupled in series to the output voltage $V_{out}$ and a ground end, and the common end of the resistors R3 and R4 outputs a divided voltage V2 to the power thermal unit 210. The power thermal unit 210 can infer the input voltage $V_{in}$ and the output voltage $V_{out}$ of the VRM 110 according to the divided voltage V1 and V2.

Figure 3C:
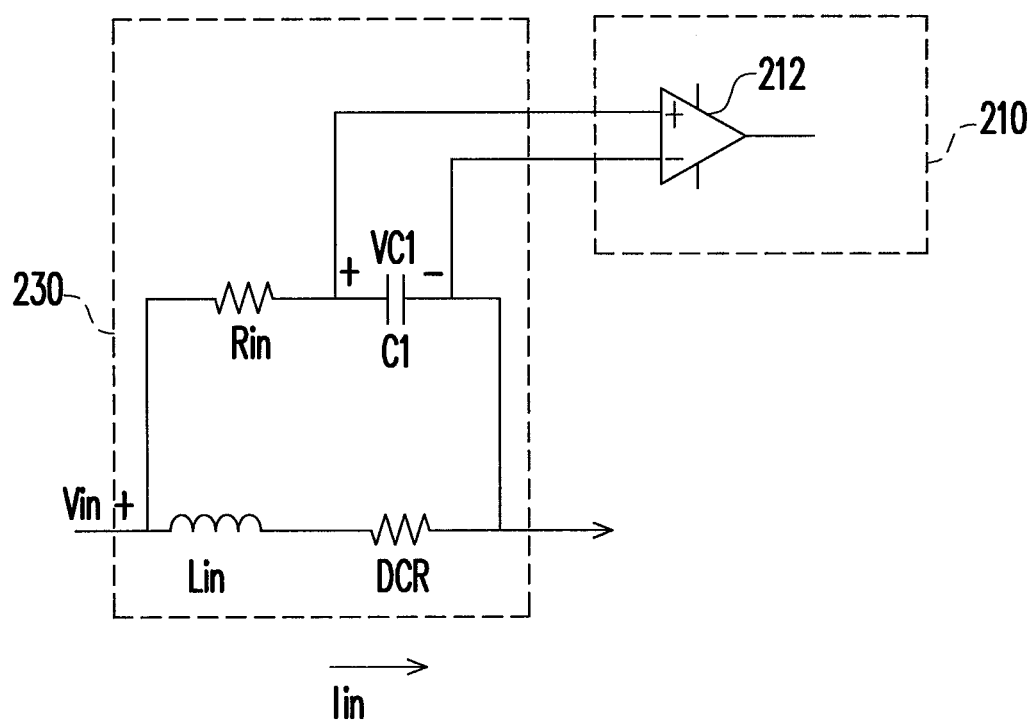
FIG. 3C is a circuit diagram showing a first current detecting circuit in one embodiment of the invention.

FIG. 3C is a circuit diagram showing the first current detecting circuit 230 in one embodiment of the invention. The first current detecting circuit 230 includes a resistor $R_{in}$, an inductor $L_{in}$ and a capacitor C1. The resistor $R_{in}$ and the capacitor C1 are coupled in series to the power source 160 and the input end of the VRM 110. The two ends of the inductor $L_{in}$ are coupled to the power source 160 and the input end of the VRM 110, respectively. The resistor DCR represents the equivalent DCR of the inductor $L_{in}$. The capacitor voltage VC1 represents the voltage difference between two ends of the capacitor C1. If the ratio of the inductor $L_{in}$ and the resistor DCR equals to $R_{in}$ multiplied by C1, the value of the capacitor voltage VC1 relates to the current flowing through the inductor $L_{in}$. The formula is as follows:

$$VC1 = I_{in} \times DCR1.$$

The power thermal unit 210 can infer the current $I_{in}$ flowing through the inductor $L_{in}$ according to the change of the capacitor voltage VC1. Therefore, a gain amplifier 212 in the power thermal unit 210 is connected to the two ends of the capacitor C1 for detecting the capacitor voltage VC1. Therefore, as long as the first current detecting circuit 230 is connected in series to the input path of the VRM 110, the input current $I_{in}$ of the VRM 110 can be inferred. Since the sensing technology of the inductor DCR is the common current detecting technology, the derivation process is omitted here. The output current $I_{out}$ of the VRM 110 can also be measured via the inductor DCR sensing technology.

Figure 3D:
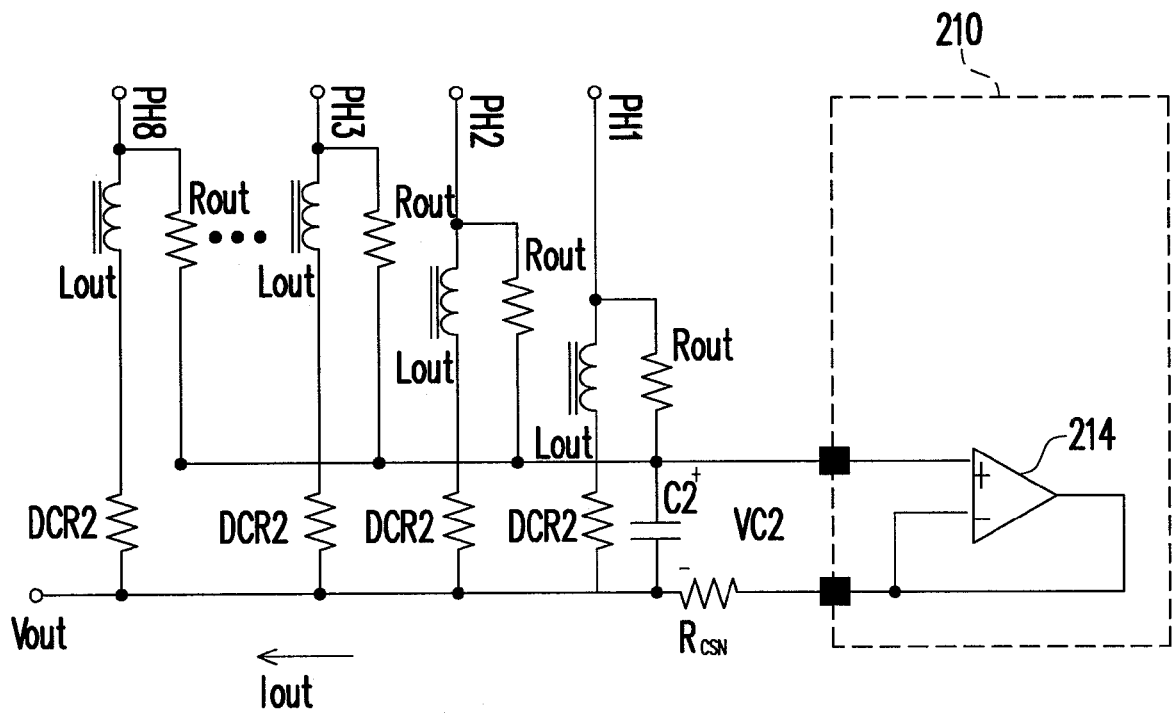
FIG. 3D is a circuit diagram showing a second current detecting circuit in one embodiment of the invention.

Similarly, the output current $I_{out}$ of the VRM 110 also can be measured via the inductor DCR sensing technology. Since the VRM 110 has an output with eight phases, the resistors and the inductors coupled in series to the output end of the VRM 110 are configured according to the current path, respectively. The capacitor is shared. FIG. 3D is a circuit diagram showing a second current detecting circuit 250 of one embodiment. The second current detecting circuit 250 includes eight resistors $R_{out}$, eight inductors $L_{out}$, a capacitor C2 and a resistor $R_{csn}$. The resistors $R_{out}$ and the inductors $L_{out}$ are disposed at the output current path of the power source PH1 to PH8 with the phases, respectively. The resistor $R_{out}$ and the other end of the inductor $L_{out}$ are coupled to the two ends of the capacitor C2. The resistor $R_{csn}$ is coupled to the power thermal unit 210 and one end of the capacitor C2. The common end of the capacitor C2 and the inductor $L_{out}$ is coupled to the power input end of the microprocessor 150. The power source PH1 to PH8 transfer the output voltage $V_{out}$ to the power output end of the microprocessor 150 via the inductor $L_{out}$ to provide the needed operating source to the microprocessor 150. The resistor DCR2 represents the equivalent DCR of the inductors $L_{out}$, respectively.

The capacitor voltage VC2 between two ends of the capacitor C2 relates to the current of the inductors $L_{out}$ of all phases. Thus, the output current $I_{out}$ can be obtained via the capacitor voltage VC2. A gain amplifier 214 in the power thermal unit 210 is connected to the two ends of the capacitor C2 for detecting the capacitor voltage VC2. The current sensing principle of the second current detecting circuit 250 is the same as that in FIG. 3C, and the main difference is that the output current $I_{out}$ composed of the multiphase power source, and thus the resistor $R_{out}$ are needed to be connected in series with the inductor $L_{out}$ in the current path of each phase for detecting the current. In the multiphase current detection, the principle is the same as that in FIG. 3C, and persons having ordinary skill can infer its application, which is omitted here for a concise purpose. The detecting circuit and the periphery circuit of the current are not limited to the voltage division circuit and the inductor DCR circuit in the embodiment, as long as it can detect the voltage and the current.

The main function of the detection module 120 is detecting the temperature and the power efficiency. The detection module 120 may include the power thermal unit 210 and the periphery circuit. The power thermal unit 210 may be a chipset with an analog to digital (A/D) converter and a gain amplifier. Since the first voltage detecting circuit 220, the first current detecting circuit 230, the second voltage detecting circuit 240 and the second current detecting circuit 250 can convert the current signal to the voltage signal, the power thermal unit 210 only needs an A/D converter, then it can output the sensing value of the voltage and the current for the calculation unit 130 calculating the power efficiency. In the temperature measurement, the A/D converter can also be used to convert the signal sensed by a thermistor to a digital signal, and provides the signal to the calculation unit 130 for calculating the thermal balance. The calculation unit 130 transfers the received data to the power source processing unit 140, and the power source processing unit 140 adjusts the current of each phase according to the temperature of some phases to achieve the effect of the thermal balance. The calculation unit 130 can be achieved by an embedded controller, and the power source processing unit 140 can be, for example, an Energy Processing Unit (EPU) on a motherboard.

Figure 4:
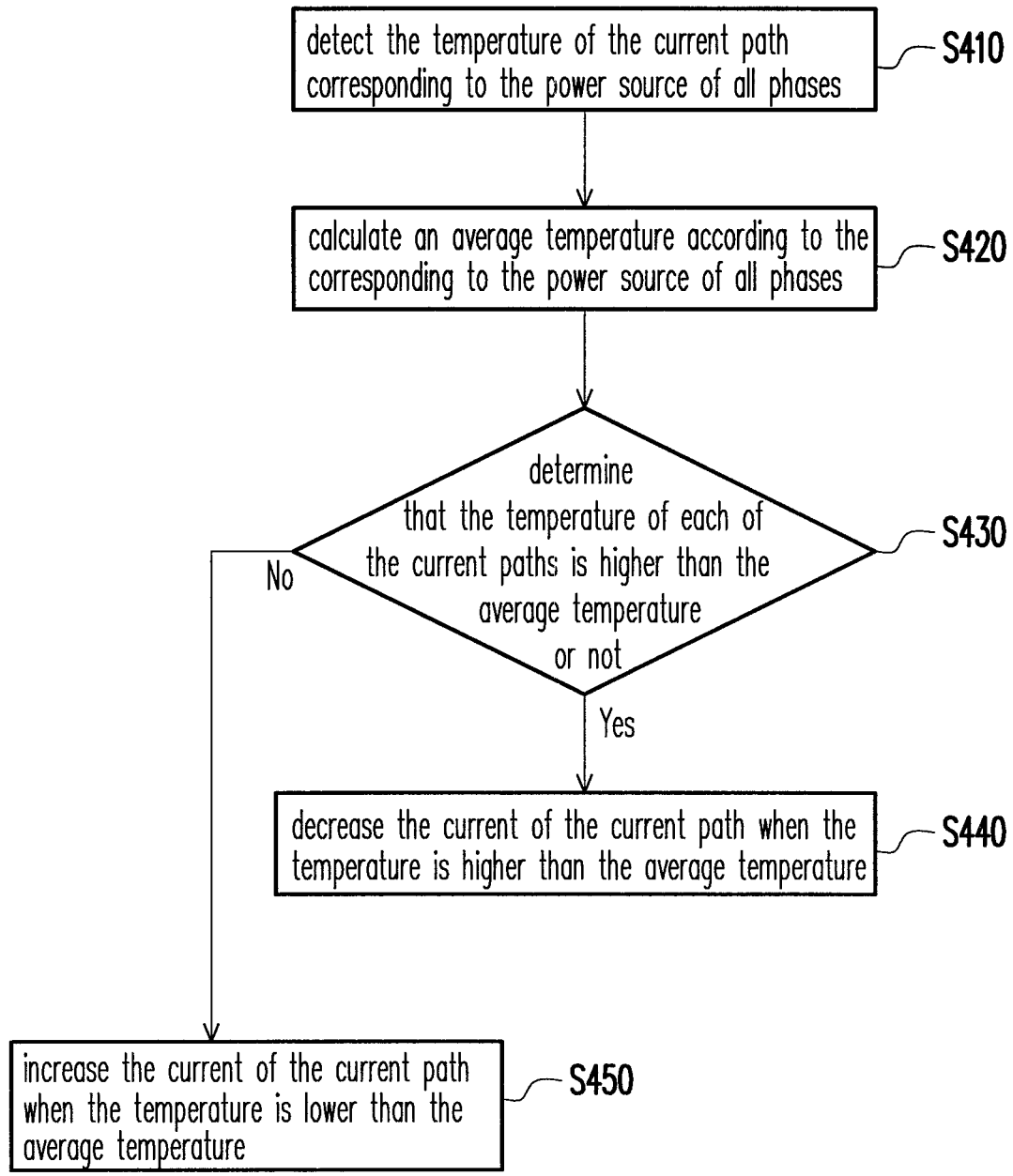
FIG. 4 is a flowchart showing a current adjusting method of a multiphase power supply device in one embodiment of the invention.

From another aspect, a current adjusting method of a multiphase power supply device is provided from the above embodiment. FIG. 4 is a flowchart showing a current adjusting method of a multiphase power supply device in one embodiment of the invention. The multiphase power supply device outputs the multiphase power source via multiple (denoted by N) current paths, and N is a positive integer. The current adjusting method includes the following steps. First, detecting the temperature of the current path of the power source corresponding to all phases (Step S410); second, calculating an average temperature according to the temperature of all the current paths (Step S420); third, comparing the temperature of each current path with the average temperature, respectively, to determine that the temperature of the current path is higher than the average temperature or not (Step S430); fourth, decreasing the current of the current path when the temperature of this current path is higher than the average temperature (Step S440); and increasing the current of the current path when the temperature of this current path is lower than the average temperature (Step S450). The method achieves the effect of the thermal balance by adjusting the current of the current path.

Furthermore, the current adjusting method may further include calculating an efficiency value of the power source according to the input voltage, the input current, the output voltage and the output current of the multiphase power supply device, and displaying the temperature and the power efficiency value of each current path. The other details about the current adjusting method above can be inferred from the above embodiment, which are omitted herein for a concise purpose.

From the above, the multiphase power supply device in the invention adjusts the current of each phase according to the temperature of each phase to achieve the effect of the thermal balance, and can automatically detect the power efficiency of the VRM. The user can know the temperature distribution of each phase and the power efficiency of the multiphase power supply device under the different loads conditions.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A multiphase power supply device, comprising:
a voltage regulator module coupled to a power source and a microprocessor and providing a multiphase power source to the microprocessor via multiple current paths;
a detection module coupled to the voltage regulator module and detecting the temperature of each of the current paths corresponding to the power source with each of the phases;
a calculation unit coupled to the detection module, wherein the calculation unit calculates an average temperature according to the temperature of each of the current paths and compares the temperature of each of the current paths with the average temperature to output a comparing result; and
a power source processing unit coupled to the calculation unit and the voltage regulator module and adjusting the current value of each of the current paths according to the comparing result,
wherein the detection module comprises:
a power thermal unit;
a first voltage detecting circuit coupled to an input end of the voltage regulator module and the power thermal unit, wherein the power thermal unit detects an input voltage received by the voltage regulator module via the first voltage detecting circuit; and
a first current detecting circuit coupled to the input end of the voltage regulator module and the power thermal unit, wherein the power thermal unit detects an input current received by the voltage regulator module via the first current detecting circuit,
wherein the first current detecting circuit comprises a capacitor and a first resistor, and the power thermal unit calculates the input current received by the voltage regulator module according to the voltages at two ends of the capacitor of the first current detecting circuit and a resistance of the first resistor of the first current detecting circuit.

2. The multiphase power supply device according to claim 1, wherein when the temperature of a first current path of the current paths is higher than the average temperature, the power source processing unit decreases the current of the first current path; and when the temperature of the first current path is lower than the average temperature, the power source processing unit increases the current of the first current path.

3. The multiphase power supply device according to claim 1, wherein the detection module further comprises:
multiple thermistors disposed at the current paths of the phases and coupled to the power thermal unit for detecting the temperature of the current paths, respectively.

4. The multiphase power supply device according to claim 1, wherein the multiphase power supply device is disposed at a motherboard.

5. The multiphase power supply device according to claim 1, further comprising a second voltage detecting circuit coupled to the current paths and the power thermal unit, respectively, wherein the power thermal unit detects an output voltage of the voltage regulator module via the second voltage detecting circuit; and
a second current detecting circuit coupled to the current paths and the power thermal unit, wherein the power thermal unit detects an output current of the voltage regulator module via the second current detecting circuit.

6. The multiphase power supply device according to claim 5, wherein the detection module outputs an efficiency value of the power source to the calculation unit according to the input voltage, the input current, the output voltage, and the output current of the voltage regulator module.

7. The multiphase power supply device according to claim 6, wherein the calculation unit displays the efficiency value of the power source and the temperature corresponding to the power source with each of the phases via a display device.

8. The multiphase power supply device according to claim 1, wherein the first voltage detecting circuit comprises:
a first resistor; and
a second resistor, wherein the second resistor and the first resistor are coupled to the input end of the voltage regulator module and a ground end, respectively, and a common end of the second resistor and the first resistor is coupled to the power thermal unit.

9. The multiphase power supply device according to claim 1, wherein the first current detecting circuit further comprises:
an inductor coupled to the power source and the input end of the voltage regulator module, wherein the capacitor and the first resistor are connected in series to the power source and the input end of the voltage regulator module.

10. The multiphase power supply device according to claim 5, wherein the second voltage detecting circuit comprises:
a first resistor; and
a second resistor, wherein the second resistor and the first resistor are coupled to a first power source and a ground end, and a common end of the second resistor and the first resistor is coupled to the power thermal unit.

11. The multiphase power supply device according to claim 5, wherein the second current detecting circuit comprises:
multiple first resistors, wherein one end of each of the first resistors is coupled to the power source with the phases outputted by the voltage regulator module, respectively;
a capacitor, wherein one end of the capacitor is coupled to the other ends of the first resistors, and the other end of the capacitor is coupled to a power input end of the microprocessor;
multiple inductors, wherein one end of each of the inductors is coupled to the power source with the phases outputted by the voltage regulator module, and the other ends of the inductors are coupled to the input end of the microprocessor; and
a second resistor coupled to the power input end of the microprocessor and the power thermal unit;
wherein the power thermal unit calculates the output current of the voltage regulator module according to the voltages at two ends of the capacitor and the resistance of the first resistors.

* * * * *